United States Patent
Wachsmuth et al.

(10) Patent No.: US 10,118,183 B2
(45) Date of Patent: Nov. 6, 2018

(54) PROCESS FOR THE SELECTIVE FLOATATION OF KAINITE FROM MINERAL MIXTURES USING SULFATED FATTY ACIDS AS THE COLLECTOR REAGENT

(71) Applicant: K+S AKTIENGESELLSCHAFT, Kassel (DE)

(72) Inventors: Uwe Wachsmuth, Bad Soden-Allendorf (DE); Jochen Brod, Landershausen (DE)

(73) Assignee: K+S AKTIENGESELLSCHAFT, Kassel (DE)

( * ) Notice: Subject to any disclaimer, the term of this patent is extended or adjusted under 35 U.S.C. 154(b) by 0 days.

(21) Appl. No.: 15/531,660

(22) PCT Filed: Dec. 1, 2015

(86) PCT No.: PCT/DE2015/000567
§ 371 (c)(1),
(2) Date: May 30, 2017

(87) PCT Pub. No.: WO2016/086910
PCT Pub. Date: Jun. 9, 2016

(65) Prior Publication Data
US 2017/0361335 A1    Dec. 21, 2017

(30) Foreign Application Priority Data
Dec. 1, 2014   (DE) ........................ 10 2014 017 645

(51) Int. Cl.
*B03D 1/02* (2006.01)
*B03D 1/012* (2006.01)
*C01D 5/12* (2006.01)
*C01D 5/16* (2006.01)

(52) U.S. Cl.
CPC ............... *B03D 1/012* (2013.01); *B03D 1/02* (2013.01); *C01D 5/12* (2013.01); *C01D 5/16* (2013.01); *B03D 2201/02* (2013.01); *B03D 2201/04* (2013.01); *B03D 2203/10* (2013.01)

(58) Field of Classification Search
None
See application file for complete search history.

(56) References Cited

U.S. PATENT DOCUMENTS

| | | | | | |
|---|---|---|---|---|---|
| 2,766,884 | A | * | 10/1956 | Perri | C01D 3/18 209/166 |
| 3,059,773 | A | * | 10/1962 | Tubiello | B03D 1/01 209/166 |
| 3,447,681 | A | * | 6/1969 | Ramirez | B03D 1/012 209/166 |

FOREIGN PATENT DOCUMENTS

| | | |
|---|---|---|
| DE | 293717 | 7/1928 |
| DE | 1 122 013 | 8/1962 |
| DE | 1 203 703 | 10/1965 |
| DE | 1 193 894 | 1/1966 |
| DE | 38 36 447 C2 | 2/1994 |
| FR | 1160 073 | 7/1958 |

OTHER PUBLICATIONS

H. Schubert, "Aufbereitung fester Stoffe Band II: Sortierprozesse," vol. 4, 1998, 6 pages.
J.L. Huiatt, et al., "Potassium Salt Flotation From Great Salt Lake Evaporites," Transactions, vol. 258, Dec. 1975, Society of Mining Engineers, AIME, pp. 303-310.
M. Hancer, et al., "The Flotation Chemistry of Potassium Double Salts: Schoenite, Kainite, and Carnallite," Minerals Engineering, vol. 13, No. 14-15, 2000, pp. 1483-1493.
H. Koehler, et al., "Reagenssysteme in der Flotation loeslicher Salze," Neue Bergbautechnik, vol. 11, No. 6, pp. 362-367, 1981.
International Search Report dated May 3, 2016 in PCT/DE2015/000567.

* cited by examiner

*Primary Examiner* — Thomas M Lithgow
(74) *Attorney, Agent, or Firm* — Oblon, McClelland, Maier & Neustadt, L.L.P.

(57) ABSTRACT

The invention relates to a process for selective flotation of kainite from crushed crude potash salts or, for example, from crystallized salt mixtures obtained by evaporation processes, which in addition to kainite may contain further minerals such as halite, sylvine and other salt minerals, for example, in order to produce a kainite concentrate fraction and a residues fraction. The separation process is characterized in that the crushed or crystallized salt mixture is intensively mixed as a crystallizate suspension with a combination of conditioning agents consisting of a sulfated fatty acid or its alkali metal salt as collecting reagent and a frothing agent known for flotation (for example, glycol ether, monohydric aliphatic alcohols, terpene alcohols, polyglycol ethers, etc.) and is then separated by agitator-driven or pneumatic flotation into a kainite concentrate fraction and a residues fraction. The resulting fractions may be further processed in downstream processes. This process permits industrial-scale processing for selective extraction of kainite from mineral mixtures by means of the flotation process.

10 Claims, No Drawings

PROCESS FOR THE SELECTIVE FLOATATION OF KAINITE FROM MINERAL MIXTURES USING SULFATED FATTY ACIDS AS THE COLLECTOR REAGENT

The present invention relates to a process for selective flotation of kainite from crude potash salts or, for example, from crystallizate suspensions that are obtained by evaporation processes and may contain, besides kainite, further minerals such as halite, sylvine and other salt minerals, using sulfated fatty acids or their alkali metal salts as collection reagent and a frothing agent known for the flotation process (combination of conditioning agents).

According to the level of knowledge heretofore, crude potash salts, which as mixed salts contain considerable proportions of kainite, can be processed only with difficulty. At present, no industrial-scale method exists for selective extraction of kainite from mineral mixtures by means of the flotation process. However, selective extraction of kainite would permit economic further processing of the kainite fraction to potassium sulfate products and therefore to marketable products. On the other hand, kainite may also be used directly as a fertilizer or as a deicing agent, for example.

In "Processing of solid raw materials", Vol. II: Sorting processes [in German], Deutscher Verlag für Grundstoffindustrie, Schubert, 1998, it is described that the flotation of kainite takes place in solutions that correspond to the existence range of kainite. For this purpose, n-alkylammonium salts of $C_8$ to $C_{12}$ chain length are used as collectors and aliphatic as well as aromatic alcohols are used as frothing agent. The flotation of kainite in the existence range of sylvine is possible with the same collectors, wherein the kainite is flotated together with the sylvine. Separation of the kainite from the sylvine can then be achieved in a second step with alkyl sulfates or alkanesulfonates as well as mixtures of branched-chain primary or secondary ammonium salts with addition of low concentrations of n-alkylammonium salts.

In "Potassium Salt Flotation from Great Salt Lake Evaporites", Transactions Society of Mining Engineers, Huiatt, Tippin and Potter, vol. 258, 303-310/1975, it is described that kainite cannot be flotated with dodecylammonium chloride and sodium dodecylsulfonate as flotation agents.

In "The Flotation chemistry of potassium double salts: Schoenite, Kainite and Carnallite", Materials Engineering, Vol. 13, No. 14-15, 1483-1493/2000, Hancer et al. describe that kainite flotation is not successful with either fatty acids or with alkylammonium salts as collectors.

In DE1122013, a process for processing a crude potash salt containing carnallite, kainite and sylvine by flotation is described, in which a high carnallite content is present. The object of the invention was to prevent simultaneous dissolution of the kainite during the decomposition of carnallite, by preconditioning the decomposition lye with the flotation agent for kainite flotation prior to decomposition of the carnallite. As an example, hydroxystearic acid sulfonate (trade name Praestabitöl) can be used as flotation agent. After decomposition of the carnallite, the residue is subjected to flotation, but selective separation of the kainite from sylvine was not achieved.

In "Reagent systems in the flotation of soluble salts; new mining technique" [in German], Köhler and Kramer, vol. 11, no. 6, 362-366/1981, the processing of a polymineral crude salt (stebnik, former Soviet Union), consisting of kainite (25%), langbeinite (10%), halite (35%), sylvine, polyhalite and argillaceous components is described, in which water glass and polyacrylamide are used as clay depressants along with a fatty acid mixture of $C_7$ to $C_9$ chain length in concentrations up to 650 g/t [g per metric ton]. In this process, all sulfate components are discharged together into the froth. Furthermore, the authors determine only the theoretical content of $K_2SO_4$ and $MgSO_4$ in the froth and do not report any analysis of the mineral phases of the froth composition, and so arbitrary sulfate salts (e.g. kainite, langbeinite) may be present in this froth. Selective kainite flotation does not take place in this process. Flotation of specific mineral phases is not described.

In Hancock, Meacham McLaughlin (1993), p. 105 and in "The Flotation chemistry of potassium double salts: Schoenite, Kainite and Carnallite", Materials Engineering, Hancer et al., Vol. 13, No. 14-15, 1483-1493/2000, it is described that kainite is difficult to flotate and must be transformed into other salts such as schoenite, since schoenite is easier to flotate. Direct flotation of kainite is not described here.

The object of the invention is to provide a flotation process that can be applied on the industrial scale, by means of which kainite can be obtained selectively from mineral mixtures, e.g. of crude potash salts which, besides kainite, also contain other salt minerals such as sylvine or halite, for example or in particular can be separated from kainite/sylvine/halite mixtures produced by crystallization. In particular, the process is intended to be applicable for kainite-containing mixtures, such as crystallizate mixtures resulting from intermediate stages of potash salt processing. It is intended that both fractions resulting from flotation can be further processed if necessary in downstream processes.

A first separation of at least one other salt mineral (e.g. sylvine, halite), especially in freshly crystallized kainite mixtures, is not successful. In freshly crystallized mixtures, the kainite is present in very fine form (for example, $d_{50}<40$ μm), whereas the minerals sylvine and halite are coarser (for example, $d_{50}>40$ μm).

Inverse flotation of the halite (by means of N-alkylmorpholine, for example Armoflote 619 of the Akzo Nobel Co.) is not successful, because the fine kainite is also present in the froth fraction, and so only inadequate separations can be achieved.

Flotation with fatty amines (for example Genamin SH100 of Clariant or Rofamin R of DHW or the like) causes the sylvine to be output in the froth fraction, but then this fraction additionally contains some kainite. Neither selective separation of the sylvine nor of the halite from the respective other components of the mixture is possible in this case.

The object is achieved by a flotation process using a combination of conditioning agents formed from a sulfated fatty acid or its alkali metal salts or mixtures of the two as collecting reagent and a frothing agent (e.g. glycol ether, a monohydric aliphatic alcohol, terpene alcohols, polyglycol ethers, etc.) known for flotation (trade name Amerfloc MI® of Ashland, former name Praestabitöl.

The general structural formula of the collector is as follows:

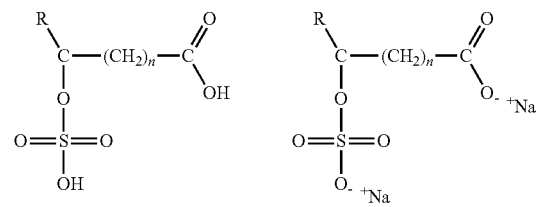

The existing carboxylic acid function can be partly esterified with sulfuric acid. In general, the sulfated fatty acids are available with different degrees of sulfation (approx. 90% degree of sulfation in these experiments).

The sulfated fatty acids can be produced by, for example, the process entitled "An improved process for treating oils or fats or mixtures of the same or fatty acids for the production of sulphuric acid compounds", STOCKHAUSEN & CIE CHEM FAB, Patent GB 293717A and in "Process for the production of highly sulfated fatty acids and fatty acid derivatives", Chemische Fabrik Stockhausen GmbH, Patent DE 3836447 C2 [in German]. In these processes, unsaturated fats or fatty acids are reacted with sulfuric acid, whereby an addition reaction takes place.

Various frothing agents are known from the technical field of flotation. For example, a glycol ether, a monohydric aliphatic alcohol, terpene alcohols, polyglycol ethers, etc. may be used.

If necessary, further auxiliary flotation agents known in general to the person skilled in the art as depressants, for example polysaccharides, starches, celluloses, guar gum, tannin and its derivatives, etc., and regulators (modified reagents), for example xanthogenates, carboxylates, petroleum, oils, etc. may be added.

The conditioning of the kainite takes place according to known procedures in a standard tank for flotation, known as a slurry tank. Therein the crude potash salts are mixed with the flotation solution, which is a saturated salt solution corresponding theoretically to the phases, together with the combination of conditioning agents. Alternatively, a suspension of crystallizates, obtained by evaporation, consisting of crystallized kainite or other salt minerals, especially of freshly crystallized kainite or other salt minerals, is mixed together with the combination of conditioning agents.

Following the mixing process, processing by flotation can take place by agitator-driven and/or pneumatic flotation. Depending on the kainite content in the charge material, one-stage or multi-stage flotation must be applied for this purpose.

The minerals in the mineral mixture to be floated must be present in loose or only slightly agglomerated condition. This can be achieved on the one hand by crushing the crude salt or on the other hand by using a crystallized salt mixture (as a crystallizate suspension) that was obtained by evaporation. In this way the presence of fresh surfaces can be ensured, in order to permit optimum adsorption by the collector.

Depending on the chosen flotation process, the solids contents of the flotation suspension in this operation may be 5 to 40 wt %.

In correlation with the specific surface of the kainite, the following quantities of auxiliary flotation agent must be used:

| | |
|---|---|
| ➢ sulfated fatty acids or their alkali metal salts | up to 500 g/$t_{solid}$, preferably 250 to 350 g/$t_{solid}$ |
| ➢ frothing agents | up to 75 g/$t_{solid}$, preferably 25 to 50 g/$t_{solid}$ |

The invention will be explained in more detail on the basis of the following exemplary embodiments.

Separation experiments on the laboratory scale will be described in Example 1 and on the production scale in Example 2. In the examples, the quantity of collector used, the quantity of frothing agent and the temperature were varied as experimental conditions.

In contrast to the common prior art processes, which transform the kainite to schoenite prior to flotation, the main components of the mixture (kainite around 40-60 wt %) are directly extracted via the froth fraction (concentrate) here, whereas the sylvine and halite remain in the residues fraction/residual mineral fraction.

EXAMPLE 1

Example 1 shows experiments on selective kainite flotation from an evaporation crystallizate with the combination of conditioning agents used according to the invention in the corresponding flotation solution/mother liquor. The sodium salt of a sulfated fatty acid was used as the kainite collector and a glycol ether was used as the frothing agent (trade name Amerfloc MI® of Ashland). The experiments were performed by means of pneumatic flotation on the laboratory scale. The evaporation crystallizate had the following composition: halite (28.5 wt %), kainite (70.5 wt %) and sylvine (1.0 wt %). The solids content of the crystallizate suspension was approx. 20 wt %. The flotation temperatures were set to 45° C. and 27° C. respectively. The conditioning time was 2 minutes and the flotation time 4 minutes.

The flotation parameters are summarized in Table 1.

TABLE 1

| | [g/t] | Concentrate fraction | | | | Residues fraction | | | |
|---|---|---|---|---|---|---|---|---|---|
| Expt. | Collector/ Frothing agent/ Temp. | Kainite [wt %] | Kainite yield [wt %] | $K_2O_{tot}$ content/ $K_2O_{tot}$ yield [wt %] | Halite content/ yield [wt %] | Kainite [wt %] | Kainite yield [wt %] | $K_2O_{tot}$ content/ $K_2O_{tot}$ yield [wt %] | Halite content/ yield [wt %] |
| 1 | 280/20 45° C. | 96.9 | 99 | 18.7/99 | 2.5/7 | 3.0 | 1 | 0.7/1 | 96.9/92 |
| 2 | 370/30 45° C. | 96.0 | 99 | 18.5/99 | 3.4/9 | 2.0 | 1 | 0.6/1 | 99.0/91 |
| 3 | 465/35 45° C. | 95.3 | 99 | 18.5/99 | 4.0/9 | 2.0 | 1 | 0.6/1 | 99.2/91 |
| 4 | 280/20 27° C. | 93.7 | 99 | 19.0/95 | 4.3/11 | 2.0 | 1 | 2.4/5 | 95.2/89 |
| 5 | 465/35 27° C. | 93.7 | 98 | 18.3/95 | 5.0/13 | 4.6 | 2 | 2.6/5 | 93.0/87 |

All results show good separation of the kainite (kainite yield 98 to 99 wt %) and high kainite contents in the concentrate (93.7 to 96.9%). The highest selectivity (96.9 wt %) in the separation of the kainite is obtained at a temperature of 45° C. together with a collector concentration of 280 g/t and a frothing agent concentration of 20 g/t (Experiment 1).

EXAMPLE 2

In the following, the efficiency of the combination of conditioning agents was tested on the production scale during continuous operation. In this case a suspension of crystallizates obtained by solution evaporation and containing halite, kainite and sylvine mineral phases was processed by flotation according to the invention in the corresponding flotation solution/mother liquor.

Crystallizate suspensions with solids contents of 20 wt % and 17 wt % (percent by weight) respectively were conditioned according to the invention and fed continuously to the pneumatic flotation system. Flotation took place in two stages with cells connected in series.

The sodium salt of a sulfated fatty acid was used as the kainite collector and a glycol ether was used as the frothing agent (trace name Amerfloc MI® of Ashland).

The concentrations of conditioning agents used were:
- sodium salt of a sulfated fatty acid
   Experiment 1A to 1C=325 g/$t_{solid}$; 2A to 2B=445 g/$t_{solid}$
- frothing agents
   Experiment 1A to 1C=25 g/$t_{solid}$; 2A to 2B=34 g/$t_{solid}$ The flotation parameters of the experiments are summarized in Table 2.

The composition of the flotation solution was chosen such that it lies in the existence range of kainite. In this regard, see below under Table 3, Examples of the composition of the flotation solutions used.

TABLE 3

Examples of the composition of the flotation solution (in g/L)

| Temp. [° C.] | $MgCl_2$ | $MgSO_4$ | KCl | NaCl | $H_2O$ |
|---|---|---|---|---|---|
| 25 | 305.0 | 40.1 | 43.5 | 26.7 | 882.7 |
| 25 | 299.7 | 51.3 | 46.0 | 27.2 | 875.7 |
| 45 | 297.9 | 31.4 | 64.2 | 32.9 | 864.7 |
| 45 | 264.1 | 59.3 | 73.1 | 42.8 | 860.0 |
| 66 | 288.6 | 45.0 | 86.5 | 39.7 | 847.3 |
| 66 | 264.8 | 50.1 | 92.6 | 46.3 | 843.3 |

The kainite fraction may be used for potassium sulfate production, for example, while the halite/sylvine fraction may be fed to a further sylvine flotation or to the hot dissolution process.

The invention claimed is:

1. A process for processing a kainite-containing crystallized salt mixture for production of a kainite concentrate fraction and a residues fraction comprising a residual mineral that is present in a solids mixture,
   the process comprising:
   separating the kainite-containing crystallized salt mixture in a one-stage or multi-stage process of separation by flotation by intensively mixing the kainite-containing crystallized salt mixture in a flotation solution with a combination of conditioning agents comprising a collecting agent comprising a sulfated fatty acid or its

TABLE 2

| Expt. | Fraction | Kainite content [wt %] | Kainite yield [wt %] | Halite content [wt %] | Halite yield [wt %] | Sylvine content [wt %] | Sylvine yield [wt %] |
|---|---|---|---|---|---|---|---|
| Phase distribution of the charge in Expt. 1A (before flotation) | | 28.3 | | 49.1 | | 22.6 | |
| 1A Results (after flotation) | Concentrate | 93.3 | 83.4 | 1.5 | 0.8 | 5.2 | 5.9 |
| | Residue | 6.3 | 16.6 | 65.2 | 99.2 | 28.5 | 94.1 |
| Phase distribution of the charge in Expt. 1B (before flotation) | | 26.2 | | 51.7 | | 22.1 | |
| 1B Results (after flotation) | Concentrate | 94.0 | 76.6 | 1.3 | 0.5 | 4.7 | 4.6 |
| | Residue | 7.8 | 23.4 | 65.4 | 99.5 | 26.8 | 95.4 |
| Phase distribution of the charge in Expt. 1C (before flotation) | | 31.0 | | 47.3 | | 21.7 | |
| 1C Results (after flotation) | Concentrate | 92.7 | 75.8 | 1.8 | 1.0 | 5.5 | 6.4 |
| | Residue | 10.0 | 24.2 | 62.7 | 99.0 | 27.2 | 93.6 |
| Phase distribution of the charge in Expt. 2A (before flotation) | | 44.3 | | 40.7 | | 15.0 | |
| 2A Results (after flotation) | Concentrate | 93.6 | 84.2 | 1.8 | 1.7 | 4.7 | 12.4 |
| | Residue | 11.6 | 15.8 | 66.5 | 98.3 | 21.6 | 87.6 |
| Phase distribution of the charge in Expt. 2B (before flotation) | | 44.8 | | 40.2 | | 15.1 | |
| 2B Results (after flotation) | Concentrate | 95.0 | 88.7 | 1.1 | 1.1 | 3.9 | 10.9 |
| | Residue | 8.7 | 11.3 | 68.3 | 98.9 | 23.1 | 89.1 |

The results of all experiments show a good kainite yield (75.8 to 88.7 wt %) and high kainite contents in the concentrate (92.7 to 95 wt %). Experiments 2A to 2B, which were performed at a higher temperature (66° C.), show the best results with respect to the kainite yield (84.2 to 88.7 wt %).

Tests 1A to 1C were performed at a temperature of 25° C. and tests 2A to 2B at a temperature of 66° C.

alkali metal salt and a frothing agent to obtain a flotation mixture, and then
separating the flotation mixture by agitator-driven or pneumatic flotation into a kainite concentrate fraction and a residues fraction,
wherein the kainite-containing crystallized salt mixture to be separated by floatation in the separating is a freshly crystallized salt mixture comprising kainite, sylvine, and halide.

2. The process according to claim 1, wherein the kainite concentrate and residues fractions are further processed in a downstream process.

3. The process according to claim 1, wherein at most 500 $g/t_{solid}$ of the sulfated fatty acid or its alkali metal salt is used as the collecting reagent.

4. The process according to claim 1, wherein at most 75 $g/t_{solid}$ of the frothing agent is used.

5. The process according to claim 1, wherein a flotation temperature is from 25° C. to 80° C.

6. The process according to claim 3, wherein from 250 to 350 $g/t_{solid}$ of the sulfated fatty acid or its alkali metal salt is used as the collecting agent.

7. The process according to claim 4, wherein from 25 to 50 $g/t_{solid}$ of the frothing agent is used.

8. The process according to claim 5, wherein the flotation temperature is from 45° C. to 70° C.

9. The process according to claim 1, wherein the combination of conditioning agents consists of the collecting agent and the frothing agent.

10. The process according to claim 9, wherein the collecting agent consists of the sulfated fatty acid or its alkali metal salt.

\* \* \* \* \*